(12) United States Patent
Zhu et al.

(10) Patent No.: US 12,536,428 B2
(45) Date of Patent: Jan. 27, 2026

(54) KNOWLEDGE GRAPHS IN MACHINE LEARNING DECISION OPTIMIZATION

(71) Applicants: International Business Machines Corporation, Armonk, NY (US); Massachusetts Institute of Technology, Cambridge, MA (US)

(72) Inventors: Yada Zhu, Irvington, NY (US); Yang Zhang, Cambridge, MA (US); Pin-Yu Chen, White Plains, NY (US); Rahul Mazumder, Somerville, MA (US); Shibal Ibrahim, Cambridge, MA (US); Wenyu Chen, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 1113 days.

(21) Appl. No.: 17/183,870

(22) Filed: Feb. 24, 2021

(65) Prior Publication Data
US 2022/0269936 A1    Aug. 25, 2022

(51) Int. Cl.
G06N 3/08 (2023.01)
G06N 3/04 (2023.01)
G06Q 40/06 (2012.01)

(52) U.S. Cl.
CPC .............. *G06N 3/08* (2013.01); *G06N 3/04* (2013.01); *G06Q 40/06* (2013.01)

(58) Field of Classification Search
CPC ............ G06N 3/08; G06N 3/04; G06N 3/045; G06N 5/02; G06N 20/00; G06Q 40/06
See application file for complete search history.

(56) References Cited

U.S. PATENT DOCUMENTS 9,996,502 B2    6/2018 Riggs et al.
10,210,518 B2    2/2019 Alnajem
(Continued)

FOREIGN PATENT DOCUMENTS

CN    112348269 A * 2/2021
EP    3 667 577 A1    6/2020

OTHER PUBLICATIONS

Yang et al., "KSM: Fast Multiple Task Adaption via Kernel-wise Soft Mask Learning" Sep. 11, 2020, https://arxiv.org/abs/2009.05668 (Year: 2020).*

(Continued)

*Primary Examiner* — David Yi
*Assistant Examiner* — Nicholas Shine
(74) *Attorney, Agent, or Firm* — Scully, Scott, Murphy & Presser, P.C.; Jordan Schiller

(57) ABSTRACT

Training a machine learning model can include receiving time series data. A knowledge graph structure can be received including nodes and edges, the nodes representing entities associated with the time series data, the edges representing relationships between the nodes connected by the edges. A machine learning model can be structured to forecast a prediction using the time series data. The machine learning model can be structured to integrate the knowledge graph structure as an error term in the machine learning model. The machine learning model can be trained to forecast the prediction based on the time series data and the knowledge graph structure. The error term representing the knowledge graph structure can be regularized for sparsity during training.

25 Claims, 9 Drawing Sheets

(56) References Cited

U.S. PATENT DOCUMENTS

| | | | |
|---|---|---|---|
| 11,710,033 B2* | 7/2023 | Morris | G06N 3/04 706/15 |
| 2019/0377819 A1* | 12/2019 | Filliben | G06N 3/084 |
| 2019/0378051 A1* | 12/2019 | Widmann | G06N 20/00 |

OTHER PUBLICATIONS

Harish Reddy, ("Regularization in Python," Nov. 7, 2019, https://harish-reddy.medium.com/regularization-in-python-699cfbad8622), (Year: 2019).*

Scheres et al., "EMBO Practical Course on Image Processing for Cryo EM," BirkBeck, University of London, Embo2015, Sep. 1, 2015, https://embo2015.cryst.bbk.ac.uk/embo2015/course/practicals/prac-2-3/Practical-2-and-Practical-3-S-Scheres-G-Zanetti-3-4-Sept-15.pdf (Year: 2015).*

Egilmez et al., "Graph Learning from Data under Structural and Laplacian Constraints" Jul. 17, 2017, https://arxiv.org/abs/1611.05181, (Year: 2017).*

Fang et al., "Tuning Parameter Selection in Regularized Estimations of Large Covariance Matrices", Journal of Statistical Computation and Simulation, 86:3, 494-509, DOI: 10.1080/00949655.2015.1017823, (Year: 2016).*

Ren et al., "A Time Sequence Predictive Modelling Method Of Fusion Graph Structure", English Translation of CN_112348269_A_I, Translated by PE2E, (Year: 2024).*

Dixit et al., "Online Learning With Inexact Proximal Online Gradient Descent Algorithms," in IEEE Transactions on Signal Processing, vol. 67, No. 5, pp. 1338-1352, (Year: 2019).*

Lee et al., "Learning the Structure of Mixed Graphical Models." J Comput Graph Stat. Jan. 1, 2015;24(1):230-253. doi: 10.1080/10618600.2014.900500. PMID: 26085782; PMCID: PMC4465824 (Year: 2015).*

NIST, "NIST Cloud Computing Program", http://csrc.nist.gov/groups/SNS/cloud-computing/index.html, Created Dec. 1, 2016, Updated Oct. 6, 2017, 9 pages.

Dangi, A., "Financial Portfolio Optimization—Computationally Guided Agents to Investigate, Analyze and Invest?", A thesis submitted for the degree of Master of Technology In Modeling and Simulation Centre for Modeling and Simulation, University of Pune, Jun. 2012, arXiv:1301.4194v1, Jan. 17, 2013, 60 pages.

Vanguard, "Portfolio Construction—A Systematic Approach to Investing", 2018, 36 pages.

Levisauskaite, K., "Investment Analysis and Portfolio Management", Leonardo da Vinci programme project, Vytautas Magnus University, 2010, 166 pages.

Roudier, F., "Portfolio Optimization and Genetic Algorithms", Master's Thesis, Swiss Federal Institute of Technology, May 17, 2007, 70 pages.

Anonymous, "Next Best Action Identification Based on Simulation of Possible Actions Outcomes Evaluated Evaluated from Perspective of Scoring and Time Series Prediction", An IP.com Prior Art Database Technical Disclosure, IP.com No. IPCOM000261625D, Mar. 23, 2020, 6 pages.

Anonymous, "Formulation & Interpolation of Time Series", An IP.com Prior Art Database Technical Disclosure, IPcom No. IPCOM000254424D, Jun. 27, 2018, 5 pages.

Feng, F., et al., "Temporal Relational Ranking for Stock Prediction", https://arxiv.org/pdf/1809.09441.pdf, 1809.09441v2, Jan. 19, 2019, 27 pages.

Matsunaga, D., et al., "Exploring Graph Neural Networks for Stock Market", Predictions with Rolling Window Analysis, https://arxiv.org/abs/1909.10660, arXiv:1909.10660v3, Nov. 27, 2019, 10 pages.

* cited by examiner

KNOWLEDGE GRAPHS IN MACHINE LEARNING DECISION OPTIMIZATION

BACKGROUND

The present application relates generally to computers and computer applications, and more particularly to machine learning and embedding knowledge graph data in machine learning.

Time series analysis, for example, time series machine learning can be used for predictions. For instance, machine learning algorithms can be trained using time series data to learn to forecast predictions. Knowledge graphs reflect relationships among different entities, for example, various connectivity between entities. Challenges exist in integrating knowledge graphs in machine learning, for example, considering, that knowledge graphs and financial time series are data in different format and co-evolving, can have noisy relationships, scalability of a number of entities and that there can be not enough data samples in time series.

By way of example, financial time series analysis can provide for optimizing investment decisions. Predicting such decisions can be a challenging problem as financial systems are usually volatile and influenced by many factors. In finance, a knowledge graph explores relationships among different entities (e.g., companies, people, news events and key metadata). Such relationships (e.g., based on industry classification, supply-chain links, products and competitors), can help investors infer the correlation of asset values across the capital market and financial value chain. For example, when steel price increases, the earning and stock price of the entire auto mobile industry is expected to decrease. Inventors in this disclosure have recognized that expanding the use of knowledge graphs to alternative factors for financial forecasting can pave the way for robust and rapid investment decision.

BRIEF SUMMARY

The summary of the disclosure is given to aid understanding of a computer system, computer architectural structure, processor, and method of machine learning described herein, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system, the architectural structure, processor, register files, and/or their method of operation to achieve different effects.

A computer-implemented method, in one aspect, can include receiving a knowledge graph structure including nodes and edges, the nodes representing entities associated with the time series data, the edges representing relationships between the nodes connected by the edges. The method can also include structuring a machine learning model to forecast a prediction using the time series data, the machine learning model structured to integrate the knowledge graph structure as an error term in the machine learning model. The method can also include training the machine learning model to forecast the prediction based on the time series data and the knowledge graph structure, the training including regularizing the error term for sparsity.

In another aspect, a method can include receiving a knowledge graph structure including nodes and edges, the nodes representing entities associated with the time series data, the edges representing relationships between the nodes connected by the edges. The method can also include structuring a machine learning model to forecast a prediction using the time series data, the machine learning model structured to integrate the knowledge graph structure as an error term in the machine learning model. The method can also include training the machine learning model to forecast the prediction based on the time series data and the knowledge graph structure, the training including regularizing the error term for sparsity. The machine learning model can include a neural network.

In another aspect, a method can include receiving a knowledge graph structure including nodes and edges, the nodes representing entities associated with the time series data, the edges representing relationships between the nodes connected by the edges. The method can also include structuring a machine learning model to forecast a prediction using the time series data, the machine learning model structured to integrate the knowledge graph structure as an error term in the machine learning model. The method can also include training the machine learning model to forecast the prediction based on the time series data and the knowledge graph structure, the training including regularizing the error term for sparsity. The machine learning model can include a graph convolutional network.

In another aspect, a method can include receiving a knowledge graph structure including nodes and edges, the nodes representing entities associated with the time series data, the edges representing relationships between the nodes connected by the edges. The method can also include structuring a machine learning model to forecast a prediction using the time series data, the machine learning model structured to integrate the knowledge graph structure as an error term in the machine learning model. The method can also include training the machine learning model to forecast the prediction based on the time series data and the knowledge graph structure, the training including regularizing the error term for sparsity. The knowledge graph structure can be transformed to an inverse covariance matrix of a Gaussian error to be expressed as the error term in the machine learning model.

In another aspect, a method can include receiving a knowledge graph structure including nodes and edges, the nodes representing entities associated with the time series data, the edges representing relationships between the nodes connected by the edges. The method can also include structuring a machine learning model to forecast a prediction using the time series data, the machine learning model structured to integrate the knowledge graph structure as an error term in the machine learning model. The method can also include training the machine learning model to forecast the prediction based on the time series data and the knowledge graph structure, the training including regularizing the error term for sparsity. The knowledge graph structure can be transformed to an inverse covariance matrix of a Gaussian error to be expressed as the error term in the machine learning model. The training jointly learns a prediction function of the machine learning model and the knowledge graph structure integrated as the error term represented by the inverse covariance matrix of the Gaussian error.

In another aspect, a method can include receiving a knowledge graph structure including nodes and edges, the nodes representing entities associated with the time series data, the edges representing relationships between the nodes connected by the edges. The method can also include structuring a machine learning model to forecast a prediction using the time series data, the machine learning model structured to integrate the knowledge graph structure as an error term in the machine learning model. The method can also include training the machine learning model to forecast the prediction based on the time series data and the knowledge graph structure, the training including regularizing the error term for sparsity. The regularizing can include using a soft mask including a real value.

In another aspect, a method can include receiving a knowledge graph structure including nodes and edges, the nodes representing entities associated with the time series data, the edges representing relationships between the nodes connected by the edges. The method can also include structuring a machine learning model to forecast a prediction using the time series data, the machine learning model structured to integrate the knowledge graph structure as an error term in the machine learning model. The method can also include training the machine learning model to forecast the prediction based on the time series data and the knowledge graph structure, the training including regularizing the error term for sparsity. The regularizing can include using a hard mask including a binary value.

In another aspect, a method can include receiving a knowledge graph structure including nodes and edges, the nodes representing entities associated with the time series data, the edges representing relationships between the nodes connected by the edges. The method can also include structuring a machine learning model to forecast a prediction using the time series data, the machine learning model structured to integrate the knowledge graph structure as an error term in the machine learning model. The method can also include training the machine learning model to forecast the prediction based on the time series data and the knowledge graph structure, the training including regularizing the error term for sparsity. The prediction can include a financial portfolio composition.

In another aspect, a method can include receiving a knowledge graph structure including nodes and edges, the nodes representing entities associated with the time series data, the edges representing relationships between the nodes connected by the edges. The method can also include structuring a machine learning model to forecast a prediction using the time series data, the machine learning model structured to integrate the knowledge graph structure as an error term in the machine learning model. The method can also include training the machine learning model to forecast the prediction based on the time series data and the knowledge graph structure, the training including regularizing the error term for sparsity. The method can also include providing a user interface for allowing a user to configure a type of the machine learning model, the time series data and the knowledge graph structure.

Yet in another aspect, a computer-implemented method can include receiving financial time series data. The method can also include receiving a knowledge graph structure including nodes and edges, the nodes representing entities associated with the financial time series data, the edges representing relationships between the nodes connected by the edges. The method can also include structuring a neural network to forecast a prediction associated with a financial portfolio composition, using the financial time series data, the neural network structured to integrate the knowledge graph structure as an error term. The method can also include training the neural network to forecast the prediction based on the financial time series data and the knowledge graph structure, the training including regularizing the error term for sparsity, wherein the training jointly learns a prediction function of neural network and the knowledge graph structure integrated as the error term represented by an inverse covariance matrix of the Gaussian error.

A system including a hardware processor and a memory device, the hardware processor configured to perform one or more of the above methods, can also be provided. A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
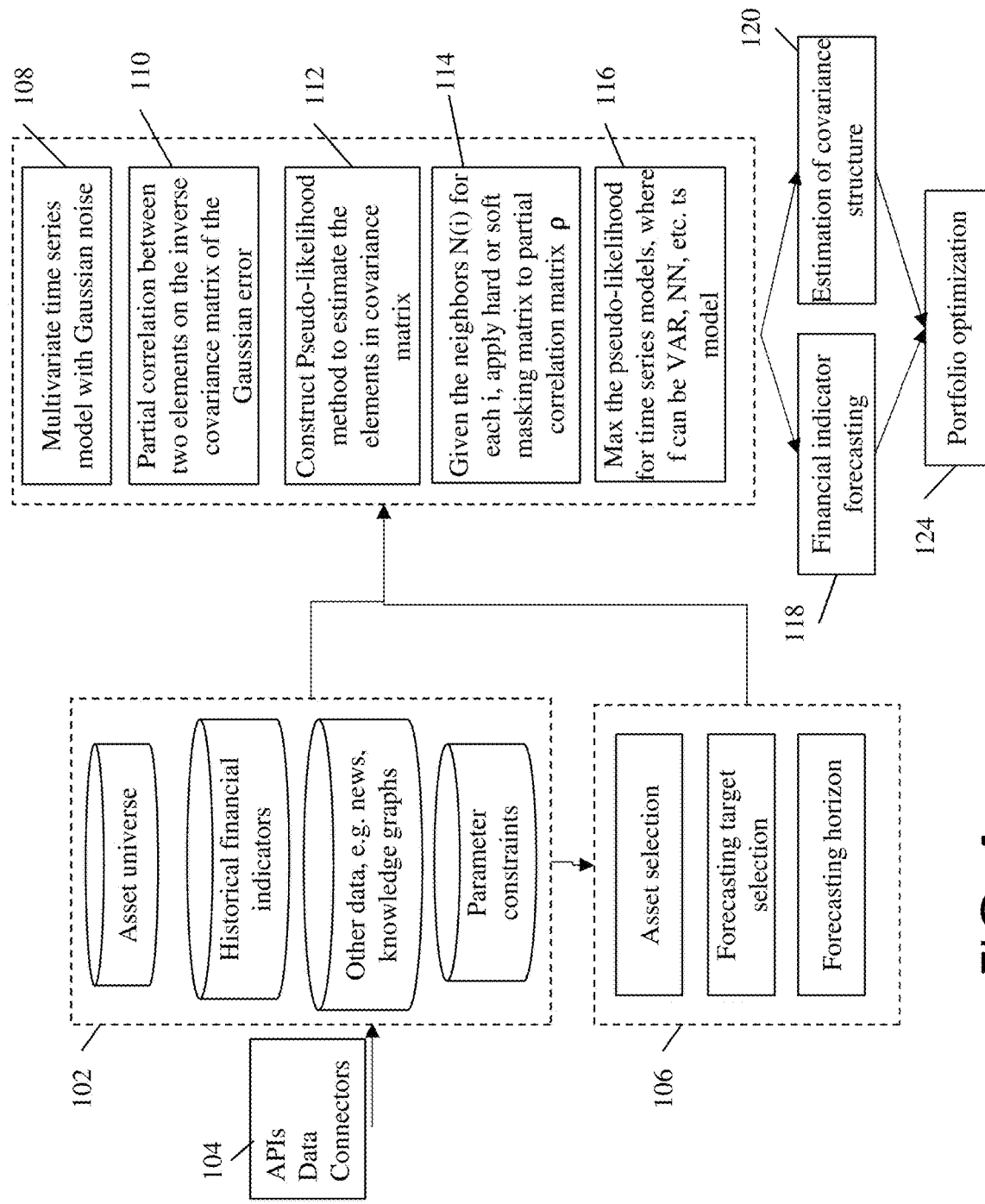
FIG. 1 is a diagram illustrating a method in an embodiment.

Systems and methods can be provided in various embodiments, which embed knowledge graphs in high-dimensional time series modeling, for example, machine learning modeling, to guide joint learning of the forecasting model and the time series correlation structure. The systems and methods can provide improvements on sample complexity, for example, for large financial networks and explainable correlation structure for portfolio risk analysis and portfolio optimization. In another aspect, a portfolio optimization system, for example, on a cloud computing environment can be provided that can take the output from the time series forecasting to construct and optimize portfolios, provide asset correlations and predict future values of the input financial indicators.

In an aspect, a flexible and explainable artificial intelligence (AI) modeling framework can be provided that can leverage massive data from multiple heterogeneous sources, for example, including external knowledge graph information, to enable reliable forecasting of time-varying indicators such as financial indicators. For instance, the forecasting can be used to optimize portfolio and maximize risk adjusted returns.

For instance, in an aspect, a system may start with a graphical time-series model for the multivariate response time series, such as the quarterly revenue of public companies, volatility of stock prices, and/or others; reparameterize the time series model via partial correlation; estimate the inverse correlation matrix via pseudo-likelihood; include knowledge graphs as mask to regularize the sparsity of the covariance matrix; and extend the linear model to temporal graph networks.

The system, for example, can include computer components, and/or computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

In an aspect, a system may leverage financial knowledge graphs in correlations of asset values across the capital market and financial value chain, to integrate data from various sources to facilitate reasoning, and to explain the learned asset correlation structure and risk propagation. Challenges may exist in that knowledge graphs (e.g., financial knowledge graphs) and financial time series are data in different format and co-evolving and may have noisy relationships. There can also be limited data samples in financial time series and scalability challenges for a large number of financial entities. A system and/or method in one or more embodiments may address such challenges, which may arise, in generating a machine learning model or prediction model integrating knowledge graph graphs (e.g., structures) and time series data.

For example, the system, in one or more embodiments, can jointly model the time series data and covariance structure by leveraging knowledge for structure sparsity which provides insights on the asset correlation and speedup machine learning model training. In an aspect, mask regularizers can be provided for knowledge graphs so that it can inform correlation structure learning efficiently. In an aspect, the system and method may overcome problems arising from small sample time series, e.g., limited time stamps, for large entity networks. The system and/or method can provide for a general learning framework that can be customized to use different time series models (linear or neural network) for prediction and sparsity structure learning.

Advantageously, the system and/or method can provide for more accurate prediction with insight and explanation on correlation structure, overcome small sample size problems relating to machine learning or modeling, and improve the speed of model training in large asset networks.

In an aspect, a cloud-based portfolio optimization system can include asset universe, forecast analysis and portfolio optimization. A flexible time series modeling framework can adapt to linear model to neural network models and two different masking regularizers to control the sparsity of the covariance structure for improved computation efficiency. The approach can jointly model time sequence data and financial knowledge graphs, automatically learn a sparse correlation structure, and provide interpretability of forecasting results via the learned covariance structure.

In an aspect, a system that can perform portfolio optimization can include a graphical user interface, for example, which can interact with end users, and allow end users to select and upload asset list, forecast individual asset future using a system built or generated machine learning model, explain asset correlation, gain insight about portfolio risk and optimize portfolio.

Time series forecasting such as financial time series forecasting can be challenging due to limited sample size, correlated samples and low signal strengths, among others. Additional information with knowledge graphs can potentially allow for improved prediction and decision making. The system and/or method disclose herein can implement a framework for jointly learning forecasting models and correlation structures that exploit graph connectivity from knowledge graphs. In an embodiment, the system, for example, provides regularizers based on knowledge graph relations to guide estimation of correlation structure. Model compression with graph convolution networks based on knowledge graph connectivity can also be provided. An algorithm is provided for exploiting parameters' sparsity in gradient calculations for correlation parameters, leading to optimization gains for networks such as large financial networks. Experimental evaluation of modelling and algorithmic methods in real-world financial markets with two types of knowledge graphs demonstrate sparser connectivity structures, runtime improvements and high-quality predictions.

Analysis of data, e.g., machine learning from data can provide for optimizing decisions. For instance, analysis of financial data, such as market prices, quarterly earnings, and indices can be considered in optimizing investment decisions. Financial data, for example, presents inherent temporal and relational properties, and therefore, graph-based learning techniques can be tools for performing statistical inference, and decision making. For instance, machine learning that integrates graph-structured data, for example, information from knowledge graphs, can improve machine learning decision making, for example, to include inferred correlation of asset values across the capital market and financial value chain.

In an embodiment, a system and/or method can provide machine learning that combines relational data with time series data such as financial signals, e.g., sequential time-series. Combining graph information with time-series models can allow for improved prediction and maintain transparency in decision making.

In an aspect, the system and/or method may overcome the difficulty attributed to the heterogeneity in time-varying cross-sectional data (e.g., market price) and graphs, both of which can be considered as different types of co-evolving data-structures, overcome the complexity arising from low signal-to-noise ratio in financial time-series data and limited sample sizes. Modelling financial networks with large number of nodes under these constraints can lead to severe overfitting and poor out-of-sample performance. The system and/or method can use additional information about the financial network via knowledge graphs to mitigate this behavior.

Figure 2:
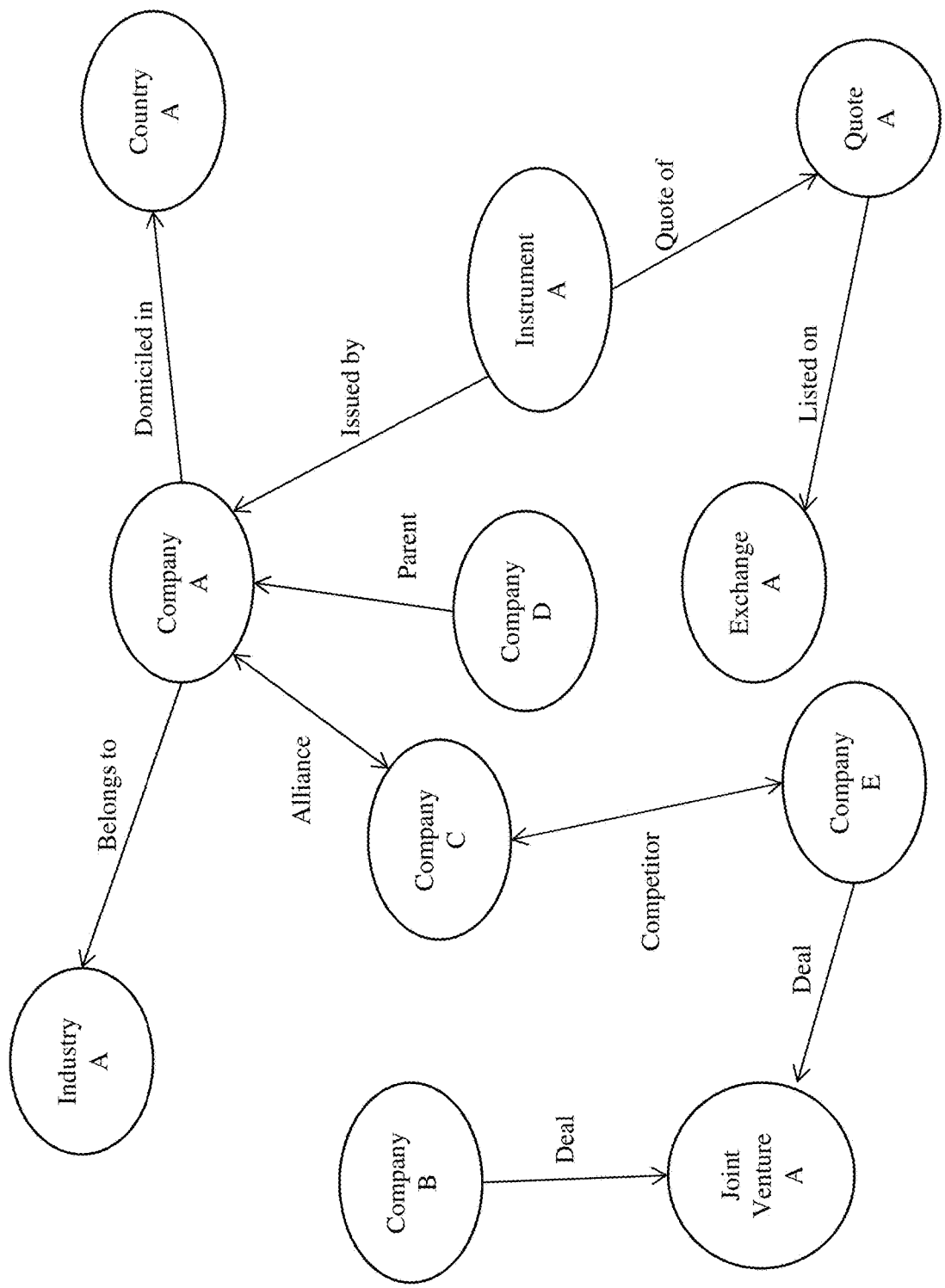
FIG. 2 shows an example knowledge graph with first and second order connectivity between financial firms in an embodiment.

Knowledge graphs reflect relationships among different entities (e.g., companies, people, news events and key metadata). FIG. 2 shows an example knowledge graph with first and second order connectivity between financial firms in an embodiment. The knowledge graph depicts various forms of connectivity information between firms in financial markets, e.g., industry classification, supply-chain links, joint product ventures, competitors, and/or others. For example, the nodes represent entities and the edges connecting the nodes represent relationships between the connected nodes. The system and/or method in an aspect use the knowledge graph information (e.g., structured use of knowledge graphs) for prediction, e.g., in terms of insights into the financial markets, statistical inference, model complexity and/or optimization.

In one or more embodiments, the system and/or method can use connectivity information through knowledge graphs to address over-parametrization in high-dimensional time-series models when simultaneously performing forecasting and learning correlation structure. Knowledge-graph-based regularizers are presented for partial correlation estimation, which lead to much sparser correlation structures as opposed to vanilla least absolute shrinkage and selection operator (lasso) and variants. The system and/or method also use knowledge graph relationships in graph-based learning approaches for model compression in the forecasting component of the high-dimensional time-series model. The system and/or method can provide an efficient implementation of a gradient-based optimization algorithm that exploit the sparsity structure of the problem. Experimental results show the improved prediction, providing improved inference, correlation structure estimation and computational efficiency.

The system and/or method may address existing limitations in known algorithms with knowledge-graph guided modelling and sparse optimization. In an aspect, the system and/or method can consider graph convolutional networks. In an aspect, forms of connectivity information such as industry-sector classification, and/or first and second order relationships can be considered in modelling with knowledge graphs. In an aspect, knowledge graph constructed on the basis of aggregated co-search of information (e.g., financial information) by analysts can also be considered. In an aspect, the system and/or method may impose sparsity inducing regularizers on the parameters and generalize them under the knowledge graph setting.

A standard regularizer in statistical learning literature is the $\ell_1$ penalty $\Omega(w)=\lambda\|w\|_1$, which originates from LASSO. As a variant of LASSO, Adaptive LASSO also incorporates the prior knowledge of w into the LASSO. More specifically, given a prior $w_0$ of w and $w_0$'s elementwise reciprocal r, the regularizer is given by $\Omega(w)=\lambda\|rew\|_1$. The idea of Adaptive LASSO is also used for the learning of vector autoregressive matrix A and partial correlation ρ. Both LASSO and Adaptive LASSO are convex relaxations of the $\ell_0$ regularizer $\Omega_\rho(\rho)$, which is equivalent to the best subset selection problem in regression. Best selection problem or its variants can be targeted via integer programming for large-size problem, an $\ell_0-\ell_2$ hybrid regularizer in the form of $\Omega(w)=\lambda_0\|w\|_0+\lambda_2\|w\|_2^2$, can be considered.

Methodology
Problem Setup
Time Series Model

The system, for example, may consider a multivariate time series model with nonstandard multivariate Gaussian noise, given by $$y_t = f(y_{t-1}, \ldots, y_{t-p}) + \varepsilon_t, \varepsilon_t \sim \mathcal{N}(0, C^{-1}) \quad (1)$$

where each $y_t \in \mathbb{R}^N$ denotes the target variables of N different companies at time t, $C \in \mathbb{R}^{N \times N}$ in (1) denotes the inverse covariance matrix of the Gaussian error, and $f: \otimes_{k=1}^p \mathbb{R}^N \to \mathbb{R}^N$ denotes the prediction function given the past p realizations of the target variables. The goal is to learn the function f and the inverse covariance matrix C from the data set $\{y_t\}$. Here, the system can further impose sparsity assumption on the inverse covariance matrix C, meaning that there are only a few strong conditional correlation between different companies.

Specification and Assumption

For financial time series applications, the target variable $y_t$ can be stock returns, stock volatilities or bond yields of N different companies; it can be option, future or derivative prices of N different assets; it can also be currency exchange rate of different countries/regions, etc. f can either be a simple linear model (e.g., vector autoregression (VAR)) or a sophisticated neural network architecture (e.g., long short term memories (LSTMs), Graph Convolutional Networks). For illustration purpose, two classes of functions are described. Other classes or functions can be considered. One class is the high-dimensional linear models—the first-order Vector Autoregression (VAR), i.e., $f(y_{t-1})=Ay_{t-1}$. The other class can be a single-layered graph convolutional network (GCN) based on knowledge graph. This is a more structural linear function class compared to VAR. Other types of neural network and/or GCN can be implemented.

In financial markets, there are common systematic risks associated with either the whole market or a certain market sector. Therefore, simply assuming the sparsity structure of C is not enough. For example, financial econometrics and statistics can use factor models to remove the market and sector trend and impose the structured assumption on the residual part of the factor model instead. After this detrending process, the residual can be considered as the individual risk of each company. It can be assumed the sparse inverse covariance structure of the residual. In an aspect, the system can use the residual part after removing the market/sector factors as a target variable $y_t$ and assume the inverse covariance matrix C is sparse.

A challenge of learning this graphical time series model (1) is jointly learning both time series prediction function f and the inverse covariance structure C. With a large pool of companies in the market, there are a large amount of parameters in f and C, but, on the contrary, the data samples for these time series learning are limited. The system in an aspect may provide solutions with the help of knowledge graph information.

Learning Error Correlations: A Pseudolikelihood Framework

The sparsity of the inverse covariance matrix C is closely related to Gaussian graphical model, which assumes the partial correlation structure forms a graph. Specifically, the partial correlation $\rho_{ij}$ between $\varepsilon_{it}$ and $\varepsilon_{jt}$ has following expression $$\rho_{ij} = \text{corr}(\varepsilon_{it}, \varepsilon_{jt} | \{\varepsilon_{kt}: k \neq i, j\}) = -\frac{c_{ij}}{\sqrt{c_{ii}c_{jj}}}. \quad (2)$$

For example, there can be two approaches to estimate the sparse inverse covariance matrix. One method is through the penalized likelihood method, particularly Graphical Lasso. However, the Graphical Lasso is a positive semi-definite (PSD) optimization problem. Since there is a need to jointly learn f and the PSD matrix C, the problem cannot scale well when the number of companies is large.

Another approach exploits the conditional distribution of multivariate Gaussian variables, and avoids positive semi-definite program by pseudo-likelihood method. Given $\{\varepsilon_{kt}: k \neq i\}$, the conditional distribution of $\varepsilon_{it}$ is $$\varepsilon_{it} | \{\varepsilon_{kt}: k \neq i\} \sim \mathcal{N}\left(\sum_{k \neq i} \rho_{ik} \sqrt{\frac{c_{kk}}{c_{ii}}} \varepsilon_{kt}, \frac{1}{c_{ii}}\right). \quad (3)$$

The pseudo-likelihood method considers maximizing an approximation of the likelihood function, $PL(\theta; \{\varepsilon_t\}) = \Sigma_{t,i} \log p_\theta(\varepsilon_{it}|\varepsilon_{-it})$, and the estimator is shown to be consistent under certain regularity condition. For Gaussian graphical model, according to (3), the pseudo-likelihood becomes least-squares between $\varepsilon_{it}$ and $\{\varepsilon_{kt}: k \neq i\}$. More specifically, ignoring the constants, the pseudo-likelihood function is $$PL(\rho, c) = \sum_{t,i} \left\{ \log c_{ii} - c_{ii}\left(\varepsilon_{it} - \sum_{k \neq i} \rho_{ik}\sqrt{\frac{c_{kk}}{c_{ii}}} \varepsilon_{kt}\right)^2 \right\}$$

To further learn the graph connectivity pattern, the system may impose sparsity inducing penalty on $\rho$'s.

Furthermore, the system may consider a more general loss $$\ell(\rho, f, c; y_{t-p}^t) = \sum_{k=1}^{N} w_i \Bigg( y_{it} - f_i(y_{t-1}, \ldots, y_{t-p}) + \quad (4)$$

$$\sum_{h=1, h \neq i}^{N} \rho_{ih} \sqrt{\frac{c_{hh}}{c_{ii}}} (f_h(y_{t-1}, \ldots, y_{t-p}) - y_{ht}) \Bigg)^2,$$

where $w_i$'s are nonnegative weights.

It is worth noting that when c is fixed, (4) can be decomposed into N subproblems, which reduces to the column-by-column estimator. Furthermore, when the weights $w_i$ are taken to be equal to $c_{ii}$, this loss (4) is equivalent to the pseudo-likelihood function $PL(\rho, c)$. Therefore, a statistical interpretation is provided for (4) as an extension of pseudo-likelihood loss. However, since the system may learn c and f and $\rho$ at the same time, the optimal solution of c to this formulation does not necessarily minimize the original pseudo-likelihood loss, because of the missing logarithmic terms in (4). Therefore, the system may correct c in each step to ensure $c_{ii}^{-1}$ is the conditional variance of $\varepsilon_{it}$ given $\varepsilon_{-it}$. (details are shown in Algorithm 1).

This loss (4), along with some regularization on f and $\rho$, leads to the final optimization problem that is looked into, given by $$L(\rho, f; c) = \frac{1}{T} \sum_{t=1}^{T} \ell(\rho, f; c, y_{t-p}^t) + \Omega_f(f) + \Omega_\rho(\rho) \quad (5)$$

for some prespecified function class and regularizers $\Omega_f$, $f_\rho$. Here, $\Omega_f$ is a regularizer that controls the complexity and provides certain interpretability of the function class. For a 1st-order VAR model, $f(y_{t-1}) = Ay_{t-1}$, and a regularizer will be $\Omega_f(f) = \lambda_A \|B \odot A\|_1$, where B is the elementwise reciprocal of the pre-estimator $\hat{A}$ and $\odot$ is the elementwise multiplication operation. As for a graph convolution network (GCN) model, a regularizer is specified, for example, below.

For $\Omega_\rho$, it induces the sparsity structure of $\rho$ (i.e. C). Additionally, in this context, knowledge graph can serve as guideposts for efficient variable selection in inverse covariance estimation in the form of additional priors on the partial correlation parameters, described below.

Masked Regularizers $\Omega_\rho$

In an aspect, since the system is jointly learning the time-series model f and the partial correlation structure $\rho$ with (5), the problem may suffer from the issue of limited sample size, as there are at least $O(N^2)$ parameters but only $O(T)$ observations. Also, the nonconvex objective with large number of parameters may lead to slow learning process. Therefore, based on the sparsity inducing regularizers, the system may take advantage of knowledge graphs to provide additional information on the sparsity pattern of $\rho$. This can help reduce the number of parameters and improve the optimization efficiency.

The knowledge graph information describes some connectivity/similarity between companies, and the system can compute a weight matrix representing the degree of this connectivity, so the system can use these weights to inform the sparsity pattern of the inverse covariance matrix C and thus restrict the number of parameters in the partial correlation $\rho$.

In an embodiment, specifically, given a knowledge graph, the system creates a symmetric weight matrix G so that each entry $G_{ij}$ measures how strong the connectivity between i and j is in the knowledge graph. Given a prespecified sparsity level K, for any company i, the system can define its neighbor N(i) as those companies j's that have top K weights $G_{ij}$ among $j \neq i$. For some knowledge graph, entries of the weight matrix G can only take value among a few numbers. In this case, taking top K weights for each i may incur a lot of ties, and an alternative way to create the neighbors is by thresholding on the whole weight matrix G.

Given the neighbors N(i) for each i, the system may define hard masking matrix $M^{hard}$ as follows $$M_{ij}^{hard} = \begin{cases} 1, & \text{if } i \in N(j) \text{ or } j \in N(i) \\ \infty, & \text{otherwise} \end{cases} \quad (6)$$

Let $G_{max}$ be the maximum entry of G, the system may define soft masking matrix $M^{soft}$ as follows $$M_{ij}^{soft} = \begin{cases} \dfrac{G_{max}}{G_{ij}}, & \text{if } i \in N(j) \text{ or } j \in N(i) \\ \infty, & \text{otherwise} \end{cases} \quad (7)$$

In the cases where the weight matrix is binary or integer, additional handling of soft masking matrix can be performed.

These masking matrices—$M \in \{M^{hard}, M_{soft}\}$—are used to impose modified regularization penalty on $\rho$. As the masking entry becomes larger, the penalty imposed on the corresponding entry of $\rho$ increases. $\infty$ masking entry essentially zeros out the corresponding element in the $\rho$ parameter matrix, reducing the model complexity. With these additional masking weights, the system may re-define our new masked regularizers as follows (In the table, r is the elementwise reciprocal of the prior knowledge/pre-estimator of $\rho$).

TABLE 1

Summary of Masked Regularizers

| | $\Omega_\rho(\rho)$ |
|---|---|
| $\ell_0 - \ell_2$ | $\lambda_0 \Sigma_{i<h} M_{ih} 1[\rho_{ih} \neq 0] + \lambda_2 \|\rho\|_2^2$ |
| Lasso | $\lambda_1 \|\text{Me}\rho\|_1$ |
| Adaptive Lasso | $\lambda_1 \|\text{Mere}\rho\|_1$ |

In an aspect, reduction in model complexity allows for a significantly faster algorithm for the optimization problem, because these masking matrices ensure sparser gradient computations in the optimization scheme. This improvement in efficiency can be significant, for example, in cases where there are a large pool of companies in the market to consider (e.g., there are about 3,000 stocks traded on New York Stock Exchange (NYSE)). In an aspect, the model complexity for the partial correlation component only grows as $\mathcal{O}(KN)$ as opposed to $\mathcal{O}(N^2)$ without any knowledge graph.

Graph Convolutional Networks

The model complexity of the forecasting component, f in general high-dimensional time-series model, presented above, grows quickly as higher time lags are considered in f with high-dimensional vector autoregressive models. The model requires estimation of $pN^2$ parameters for the autoregressive matrices in addition to $N(N-1)/2$ parameters for partial correlation. This high-dimensionality, coupled with limited sample sizes, may lead to overfitting in high-dimensional VARs. The availability of knowledge graphs can help correct for large model complexity in VARs in a transparent way with the use of graph-based learning approaches. The graph information can restrict the really high-dimensional linear class of functions explored by higher-order VARs. In an embodiment, according to this modelling approach for time-series prediction, the past time-samples of multivariate time-series are processed with graph operations, e.g., graph convolution, before being fed into a linear model of significantly reduced model complexity. This model compression aspect of graph-based linear models over high-dimensional VARs can provide for improved predictive performance, for example, in financial network applications with limited data.

In an aspect, a single-layered Graph Convolution Network (GCN) falls under the linear model class. In an aspect, the following can be defined as the time-series forecasting function $f(y_{t-1}, \ldots, y_{t-p}, G)$ for GCN:

$$y_t = \tilde{G} X_t W \quad (8)$$

where $X_t = [y_{t-1}, \ldots, y_{t-p}]$ is the input data, $$\tilde{G} = \tilde{D}^{\frac{1}{2}}(G+I)\tilde{D}^{\frac{1}{2}}$$

is the normalized graph matrix apriori defined based on the knowledge graph, $\tilde{D}_{ii} = \Sigma_j \tilde{G}_{ij}$, and $W \in \mathcal{R}^p$ is the weight vector to be estimated. The system may impose $\ell_2$ regularization on W, i.e. $\Omega_f(f) = \lambda_w \|W\|_2^2$. In an aspect, this is an adaptation of the original Graph Convolution Networks to cater to additional (time) sample dimension at each node for learning with multiple time instances. In an aspect, a single-layered graph convolution network is a highly structured instance of a high-dimensional VAR model. This can be understood by expanding out the VAR and GCN functions as given below:

$$\text{GCN: } f_{it} = \sum_{k=1}^p \sum_{j=1}^N \tilde{G}_{ij} y_{jt-k} w_k \quad (9)$$

$$\text{VAR: } f_{it} = \sum_{k=1}^p \sum_{j=1}^N A_{ijk} y_{jt-k}$$

Comparing the two linear models, it can be seen that the product $\tilde{G}_{ij} w_k$ in GCN are more specialized instances of the general $A_{ijk}$ entries in the VAR case. The model complexity for the forecasting component reduces from $N^2 p$ for VAR to p in GCN because of parameter sharing and availability of additional graph connectivity. This compression shifts the overall model complexity from the forecasting component ($O(pN^2)$) in VARs with partial correlation to the correlation component ($O(N^2)$) in GCN with partial correlation. The sample scenarios benefit from this model compression considering the knowledge graph has informative connectivity structure. Improved predictive performance can be shown on financial markets under a general time-series modelling approach.

Algorithm

An algorithm for (5) is developed, for example (but not limited to), for the time-series model such as VAR or single-layered GCN. Since both models are linear in their parameters, it can be assumed f is parametrized by $\theta$ and the corresponding $\Omega_f(f)$ becomes $\Omega_\theta(\theta)$. The algorithm is alternately updating $w=(\theta,\rho)$ by proximal gradient descent and updating c via the conditional variance formula (3). The algorithm is detailed below in Algorithm 1 in an embodiment.

---

Algorithm 1 - Algorithm for (5)

Input: Learning rate $\gamma$, Initialization $\theta^{(0)}$, $\rho^{(0)}$, $c^{(0)}$
1:      for k = 0, 1, 2, ... do
2:      Update $w^{(k+1)} = (\theta^{(k+1)}, \rho^{(k+1)})$ by solving $$\min_{\theta,\rho} \frac{\gamma}{2} \|w - \tilde{w}\|^2 + \Omega_\theta(\theta) + \Omega_\rho(\rho), \quad (10)$$

where $\tilde{w} = w^{(k)} - \gamma \nabla_w L(\theta^{(k)}, \rho^{(k)}, c^{(k)})$
3:      Compute $\varepsilon_{it}^{(k+1)} = y_{it} - f_{it}(y_{t-p}^{t-1}; \theta)$
4:      Compute $u_{it}^{(k+1)}$ via $$u_{it}^{(k+1)} = \varepsilon_{it}^{(k+1)} - \sum_{j \neq i} \rho_{ij}^{(k+1)} \sqrt{\frac{c_{jj}^{(k)}}{c_{ii}^{(k)}}} \varepsilon_{jt}^{(k+1)}$$

5:      Compute $c_{ii}^{(k+1)} = 1/\text{Var}(u_{it}^{(k+1)})$
6:      end for

---

For solving the proximal problem (10), from the separability of the objective, for each component of $\theta$, the proximal problem becomes the following problem $$\min_a \frac{1}{2}(a - \tilde{a})^2 + \lambda |a|,$$

which admits a closed form solution $a^* = \text{sign}(\tilde{a})(|\tilde{a}| - \lambda)_+$. This also applies to $\rho$ in the cases where $\Omega_\rho$ is lasso or adaptive lasso penalty. In the $\ell_0 - \ell_2$ case, the system can compute each $\rho_{ij}$ by solving the following problem $$\min_a \frac{1}{2}(a - \tilde{a})^2 + \lambda_0 1[a \neq 0] + \lambda_2 a^2,$$

which is given by $$a^* = \begin{cases} \frac{\tilde{a}}{1+2\lambda_2} & \text{if } \tilde{a}^2 > 2\lambda_0(1+2\lambda_2) \\ 0 & \text{if } \tilde{a}^2 < 2\lambda_0(1+2\lambda_2) \\ \left\{0, \frac{\tilde{a}}{1+2\lambda_2}\right\} & \text{if } \tilde{a}^2 = 2\lambda_0(1+2\lambda_2) \end{cases}$$

The following definition and theorem provide some insight on the convergence of the algorithm.

Definition 1 For a lower semi-continuous (lsc) function $\varphi$, its Fréchet subdifferential is defined as $$\partial_F \varphi(w_0) = \left\{\xi : \liminf_{h \to 0} \frac{\varphi(x_0 + h) - \varphi(x_0) - \langle \xi, h \rangle}{\|h\|} \geq 0\right\}$$

Let $f(x) = g(x) + \varphi(x)$, where g is continuously differentiable and $\varphi$ is lsc. The set of stationarity point of f is defined as $$X^* = \{x : 0 \in \nabla g(x) + \partial \varphi(x)\}.$$

Theorem 1 Assume that $\nabla_w L(w; c)$ is $\sigma$-Lipschitz for any c. For any fixed c, if the system updates $w^{(k)}$ iteratively via (10) with $$\gamma \in \left(0, \frac{1}{\sigma}\right),$$

and let $\bar{w}$ be a limiting point of $\{w^{(k)}\}$, then $\bar{w}$ is a stationary point of $L(\bullet; c)$.

This theorem shows that if the system fixes c and keep updating $w = (\theta, \rho)$, the algorithm may converge to a stationary point. Since the system is updating c via the conditional variance formula, c will move towards the optimal c for pseudo-likelihood loss. At the same time, the update (10) will drive w towards the stationary point of L given c. Therefore, this provide heuristics on how Algorithm 1 may work.

In an aspect, an implementation of the algorithm exploits the sparsity structure of the masking matrix and performs sparse gradient computation and proximal update. Therefore, there can be optimization boost using the sparse graph masking matrix.

FIG. 1 is a diagram illustrating a method in an embodiment. The method can be implemented or run on one or more computer processors, for example, including hardware processors. Data 102 such as asset universe, historical financial indicators, other data such as news, knowledge graphs and/or parameter constraints can be received or obtained. For instance, there can be application programming interfaces (APIs) and/or data connectors 104, providing access to such data or information.

Selections or configurations 106 for modeling can also be received or obtained. For instance, a user may provide via a user interface configuration setting for asset selection, forecasting target selection (e.g., target prediction such as but not limited to, stock returns, stock volatilities or bond yields of N different companies, option, future or derivative prices of N different assets, currency exchange rate of different countries/regions, and/or others) and/or forecasting horizon (time line or period).

At 108, a multivariate time series model with Gaussian noise can be generated, defined or structured. An example is shown in Eq. (1) above.

At 110, partial correlation between two elements on the inverse covariance matrix of the Gaussian error can be obtained, generated, defined or structured. An example is shown in Eq. (2) above.

At 112, pseudo-likelihood method is constructed to estimate the elements in covariance matrix. An example is shown and described above as $$PL(\rho, c) = \sum_{t,i} \left\{ \log c_{ii} - c_{ii} \left( \varepsilon_{it} - \sum_{k \neq i} \rho_{ik} \sqrt{\frac{c_{kk}}{c_{ii}}} \varepsilon_{kt} \right)^2 \right\} \text{ where }$$

$$\varepsilon_{it} \mid \{\varepsilon_{kt} : k \neq i\} \sim N\left(\sum_{k \neq i} \rho_{ik} \sqrt{\frac{c_{kk}}{c_{ii}}} \varepsilon_{kt}, \frac{1}{c_{ii}}\right)$$

as in Eq. (3).

At 114, given the neighbors N(i) for each i, hard or soft masking matrix is applied to partial correlation matrix $\rho$. At 116, the pseudo-likelihood for time series models can be maximized or optimized, where f can be VAR, NN, etc. times series model. At 114 and 116, joint optimization with respect to both the time series and inverse covariance structure can be performed. An example is shown and described in Eq. (4) and Eq. (5) above. In Eq. (5), for example, f can be any time series model such as VAR, LSTM, GCN and/or others. In Eq. (5), masked regularizer ($\Omega_\rho(\rho)$) based on knowledge graphs is used to learn the partial correlation structure. Masked regularizers are shown and described in Eq. (6) and Eq. (7) above.

At 118, based on the trained model, financial indicator forecasting. At 120, based on the trained model, estimation of covariance structure can be performed. In an aspect, the financial indicator forecasting and estimation of covariance structure are performed jointly.

At 122, portfolio optimization can be performed. For example, running the trained model can predict asset allocation such as portfolio composition.

Experimental Results

Data

Stock Volatilities Time-Series

Experimental evaluation is performed on the combination of time-series prediction with Knowledge Graph in the context of market volatilities. The experiment considers two different financial markets S&P500 and S&P1500 and defines the daily volatility using the daily high and low stock price:

$$\hat{\sigma}_{it}^2 = 0.361(\log p_{it}^{high} - \log p_{it}^{low})^2 \qquad (11)$$

where $p_{it}^{high}$ and $p_{it}^{low}$ denote the maximum and minimum price of stock i on day t. The experiment conditioned on the corresponding market index: S&P500 or S&P1500 and 9 sector indices. This reduces the number of companies to 383 for S&P500 and 1,009 for S&P1500 markets. In the experiment, the target variable y is the idiosyncratic volatility residuals computed via least squares optimization.

Knowledge Graph (KG) Using Cosearch

For the experiment, a KG is generated between firms by collecting cosearch of peer firms. Analysts collectively search for financial data on economically-related or similar firms. The cosearch of peer firms by users can explain a degree of similarity between firms. The experiment used cosearch to extract meaningful information about graph connectivity and construct a knowledge graph. For example, for each pair of firms (i,j), the number of unique users searching for both firms i and j is used to define a daily co-search proportion, which can be aggregated annually. These search peers may reflect the collective view of similarity between firms across all users. The experiment evaluates the effectiveness of KG in categorizing long-term contemporaneous correlation behavior through masked regularizers on partial correlation and identifying adjacency for forecasting in graph convolutional networks.

Other Knowledge Graphs

Other knowledge graphs can also be employed. Such knowledge graph may include information about entities and relationships (e.g., supply chain relationships), similarities among entities, and other metadata.

Setup

An example experimental setup considers two financial markets S&P500 and S&P1500, using daily stock volatilities residuals from 2013-2016. The experiment set 2013-2014 as the training period, 2015 as hyperparameter validation period and 2016 for final model evaluation. There are 504 days in the training period (as compared to the 383 companies for SP500 and 1,009 companies for SP1500) to evaluate proposed methodology on small sample size regime. In an aspect, the modelling approach is evaluated in terms of $R^2$ performance, sparsity of partial correlation structure, optimization runtimes' improvement and model compression (demonstrated by #params). The experiment follows $R^2$ definition where the computation of $R^2$ uses zero-mean prediction in the denominator (as the market and sector factors have been accounted for).

The experiment evaluated the utility of knowledge-graph based regularizers (constructed from different knowledge graphs) by comparison with various regularizers that do not use additional knowledge graph connectivity information. The experiment performed the optimization using the algorithm (Algorithm 1). The baseline scenario refers to non-masked regularizered models optimized via the algorithm; the shooting method for optimizing high-dimensional vector autoregressive models with partial correlation (VAR-PC) is not state-of-the-art for solving lasso-type problems and not easily generalizable to general time-series models beyond VAR forecasting components. The experiment also evaluated the effectiveness of aforementioned knowledge graphs as adjacency matrices in graph convolutional networks with partial correlation (GCN-PC).

Results Discussion

Table 2 presents results for prediction of daily volatilities residuals defined as data as described above. Table 2 confirms that the KG-masked regularizers provide faster optimization because of reduction in the number of partial correlation parameters. The optimization gains depend on the number of neighbors in the masking matrices. In this experiment, empirical investigations suggest that 75 peers are sufficient to ensure that there is no degradation in performance in terms of $R^2$ performance and provide significant computational gains (up to 3 and 10 times for S&P500 and S&P1500 markets respectively). There may be tradeoff between model complexity with computational scalability.

TABLE 2

Evaluating different KG-masked regularizers for VAR-PC in predicting daily volatilities for (S&P500).

| Type of Mask | $\Omega_\rho(\rho)$ | R-type of regularizer specified in Table 1 (%) | nnz(ρ) (%) | Speed-up |
|---|---|---|---|---|
| None | | 34.44 | 16.77 | Baseline |
| Hard | Lasso | 34.07 | 17.62 | 3.8 × |
| Soft | | 34.51 | 13.42 | 2.9 × |
| None | | 33.32 | 10.49 | Baseline |
| Hard | Adaptive | 33.59 | 9.88 | 2.6 × |
| Soft | Lasso | 33.56 | 9.25 | 2.6 × |
| None | | 32.64 | 34.35 | Baseline |
| Hard | $\ell_0 - \ell_2$ | 33.79 | 12.61 | 3.1 × |
| Soft | | 33.65 | 8.35 | 3.0 × |

Additionally, the KG-input also results in more compact correlation structure as observed by the percentage of non-zeros of the recovered partial correlation $\rho \in \mathbb{R}^{N \times N}$ denoted by nnz(ρ) (%) ρ in the table. The masked-regularizers can give up to 5 times sparser partial correlation estimates. The partial correlation sparsity patterns under different regularizers can be visualized. The correlation heatmaps, which can be plotted show that although the values of ρ are different, different regularizers can give similar sparsity patterns in ρ, demonstrated by the correspondences between the spikes in ρ and the spikes in G. In an aspect, a pseudolikelihood framework disclosed herein uses knowledge graph as a guide to arrive at the true correlation structure.

Table 3 reports a graph convolutional network with partial correlation results. In an example experiment, 17% improvement in $R^2$, 9 times reduction in model complexity and 22% improvement in sparsity of partial correlation over VAR-PC are observed.

TABLE 3

Evaluating VAR-PC and GCN-PC in predicting daily volatilities for (S&P500).

| Model Lasso(ρ) | $R^2$ (%) | nnz(ρ) (%) | # params |
|---|---|---|---|
| VAR-PC | 34.44 | 16.77 | 220k |
| GCN-PC (herein) | 39.51 | 21.01 | 73k |
| GCN-PC-Hard (herein) | 0.28 | 13.08 | 25k |
| GCN-PC-Soft (herein) | 40.06 | 19.92 | 25k |

In general, the experiment results show improvement in prediction performance, more computational efficiency, more sparsity on the covariance structure for structured explanation. Sparse granger causality interpretation via linear time model or structured GCNs can be performed.

A general framework is disclosed for jointly learning forecasting models (e.g., high-dimensional time-series models, GCNs), correlation structures with models based on knowledge graphs under a pseudolikelihood framework. Based on empirical results, the approach leads to improved prediction, reduced model complexity and computational efficiency. Hence, for example, computing and/or memory efficiency of a computer system can be improved.

Figure 3:
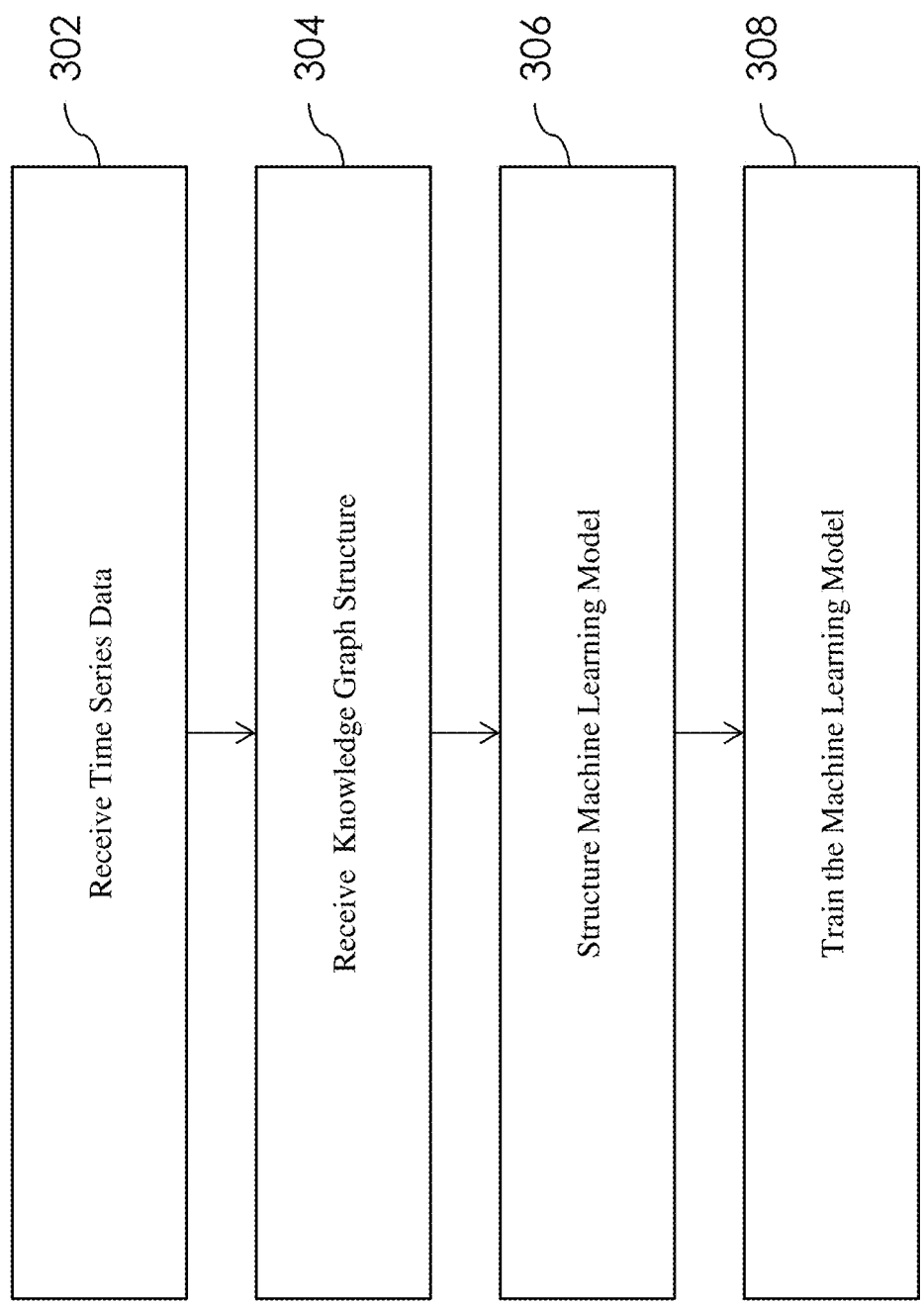
FIG. 3 is another flow diagram illustrating a method in an embodiment.

FIG. 3 is another diagram illustrating a method in an embodiment. The method can be implemented or run on one or more computer processors, for example, including hardware processors. At 302, time series data is received. For example, data can be received via an API or another data connector, for example, remotely or locally. The data can be stored on a storage device.

At 304, one or more knowledge graph structures can be received. A knowledge graph structure can include nodes and edges. The nodes represent entities associated with the time series data and the edges representing relationships between the nodes connected by the edges. Nodes can also contain data about entities, e.g., metadata. An example knowledge graph structure is shown in FIG. 2.

At 306, a machine learning model is structure or generated to forecast a prediction using the time series data. The machine learning model can be structured to integrate the knowledge graph structure as an error term in the machine learning model.

At 308, the machine learning model is trained to forecast the prediction based on the time series data and the knowledge graph structure. The error term can be regularized for sparsity in training.

In an aspect, the machine learning model includes a neural network. In another aspect, the machine learning model can include a graph neural network such as, but not limited to, a graph convolutional network.

In an aspect, the knowledge graph structure is transformed to an inverse covariance matrix of a Gaussian error to be expressed as the error term in the machine learning model. The training in an aspect jointly learns a prediction function of the machine learning model and the knowledge graph structure integrated as the error term represented by the inverse covariance matrix of the Gaussian error.

In an aspect, regularizing includes using a soft mask including a real value. In another aspect, regularizing includes using a hard mask including a binary value. In an aspect, the machine learning model can be run to predict financial portfolio composition, for example, to optimize an investment portfolio.

In an aspect, a user interface can be provided for allowing a user to configure a type of the machine learning model, the time series data and the knowledge graph structure.

Figure 4:
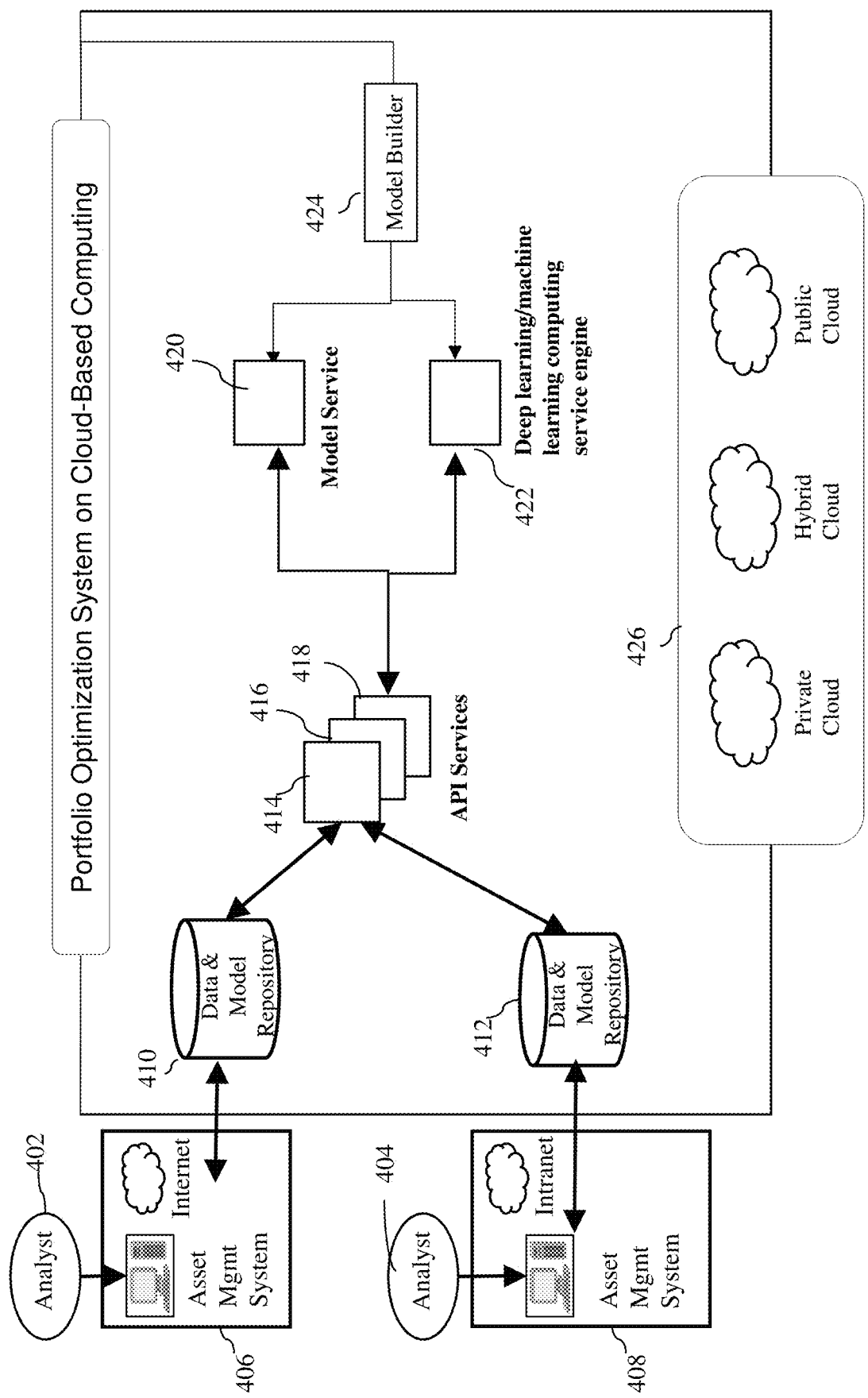
FIG. 4 is a diagram illustrating a tool for building a machine learning model in a cloud-based computing environment in an embodiment.

FIG. 4 is a diagram illustrating a tool for building a machine learning model in a cloud-based computing environment in an embodiment. Users such as analysts or portfolio managers 402, 404 may access the functionalities of the tool via a user interface and network such as an Internet and/or intranet 406, 408. Data and model repositories 410, 412 can store input and output data, such as the time series data, knowledge graph structure data, and also a plurality of machine learning models. API services 414, 416, 418 provide interfaces to a model service 420 building and/or running a model. A deep learning and/or machine learning computing service engine 422 works with the service 420 and a model builder 424 to provide a requested service, for example, building a machine learning model as described herein, and/or running a built machine learning model. The cloud-based system can be different types of cloud, e.g., as shown at 426. To end users, for example, a knowledge-based portfolio optimization system can be provided for forecasting asset selection, forecasting results and optimized portfolio.

Figure 5:
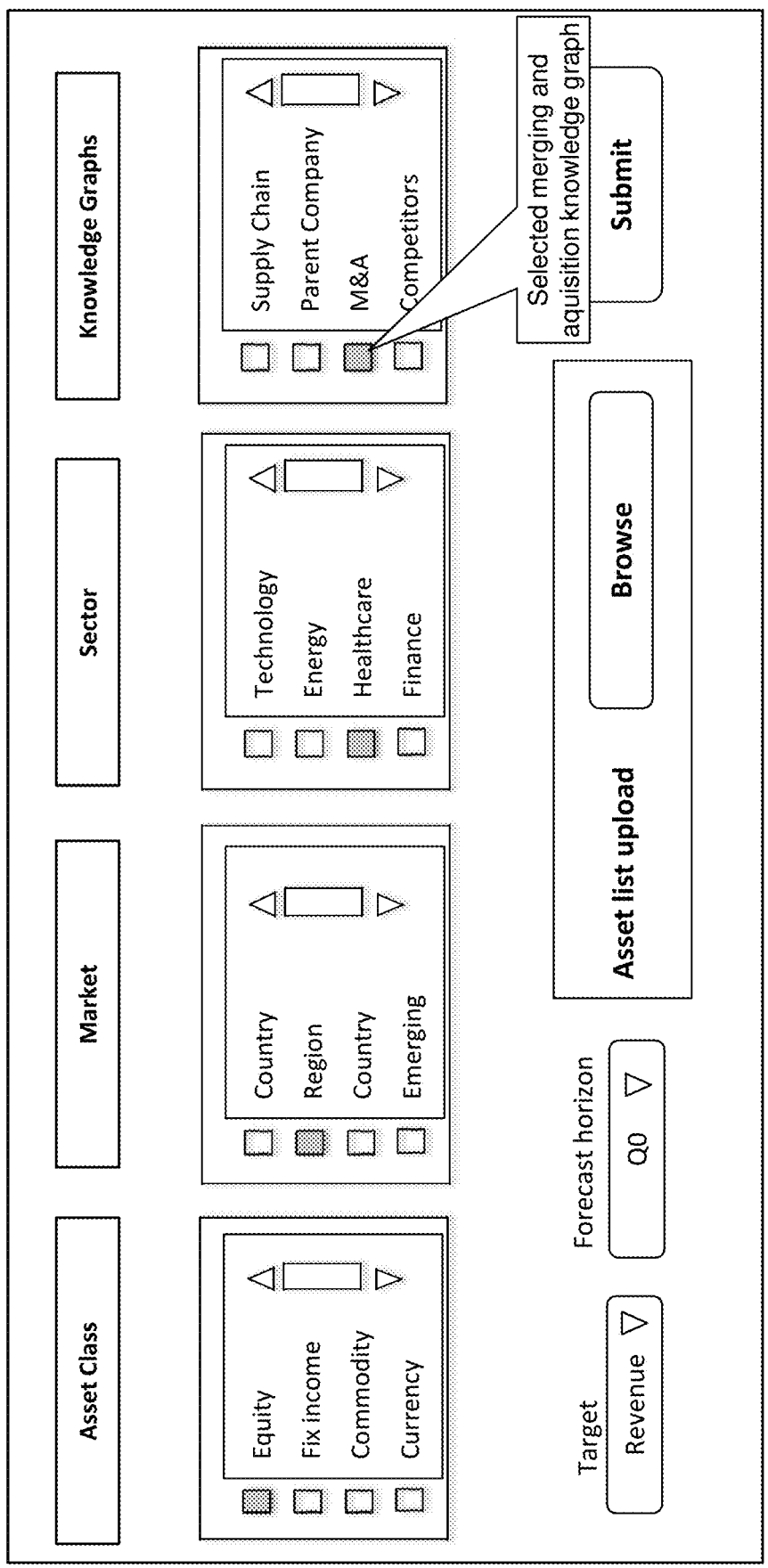
FIG. 5 is a diagram showing a user interface of a tool for performing forecasting asset selection in an embodiment.

FIG. 5 is a diagram showing a user interface of a tool for performing forecasting asset selection in an embodiment. The user interface, for example, can be run on a user machine (e.g., shown at 406, 418 in FIG. 5), which can include communication or network capabilities, for instance, for connecting and communicating with one or more API services on a remote system. In another aspect, the user interface can interact with a standalone system, for example, not limited to a cloud-based system. The display screen of the user interface shows an interface for performing forecasting asset selection. For example, asset class, market and sector can be selected for the time series model. Types of knowledge graphs can also be selected or configured. In an embodiment, more than one knowledge graph can be selected. For example, the user can select or directly upload list of assets to forecast its future and construct the portfolio. Running the built model can produce forecast prediction, for example, which can be visualized graphically. For example, a plot of prediction values can be provided along a time line, e.g., a 2-dimensional graph having x-y axis, one axis representing time and another axis representing the prediction value. Learned correlation structure (e.g., knowledge graph structure) among entities associated with the time series data can also be visualized, for example, with nodes and edges connecting the nodes having correlations.

Figure 6:
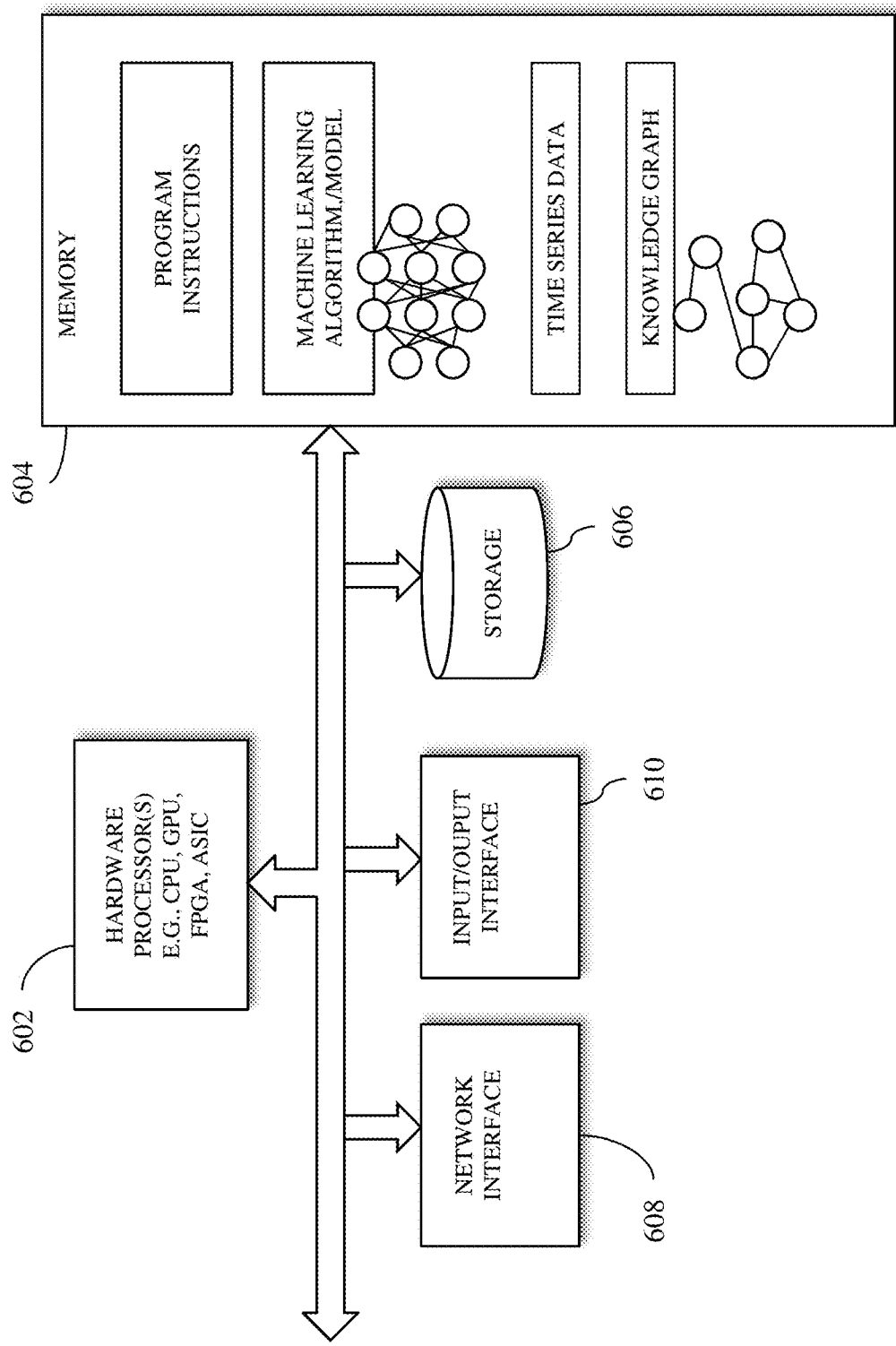
FIG. 6 is a diagram showing components of a system in one embodiment that can perform knowledge graph-based learning, for example, for time series prediction, in an embodiment.

FIG. 6 is a diagram showing components of a system in one embodiment that can perform knowledge graph-based learning, for example, for time series prediction, in an embodiment. The system, for example, can perform multi-dimensional financial prediction. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and generate a prediction model and forecast predictions. A memory device 604 may include random access memory (RAM), read-only memory (ROM) or another memory device, and may store data and/or processor instructions for implementing various functionalities associated with the methods and/or systems described herein. One or more processors 602 may execute computer instructions stored in memory 604 or received from another computer device or medium. A memory device 604 may, for example, store instructions and/or data for functioning of one or more hardware processors 602, and may include an operating system and other program of instructions and/or data. One or more hardware processors 602 may receive input, for example, including time series data and one or more knowledge graphs or knowledge graph structures. For instance, at least one hardware processor 602 may structure a machine learning model to forecast a prediction using the time series data, the machine learning model structured to integrate the knowledge graph structure as an error term in the machine learning model. At least one hardware processor 602 may train the machine learning model to forecast the prediction based on the time series data and the knowledge graph structure, at least one hardware processor 602 configured to regularize the error term for sparsity during training. In one aspect, time series data and/or knowledge graph structure data may be stored in a storage device 606 or received via a network interface 608 from a remote device, and may be temporarily loaded into a memory device 604 for building or generating the prediction model. The learned prediction model may be stored on a memory device 604, for example, for running by one or more hardware processors 602. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

Figure 7:
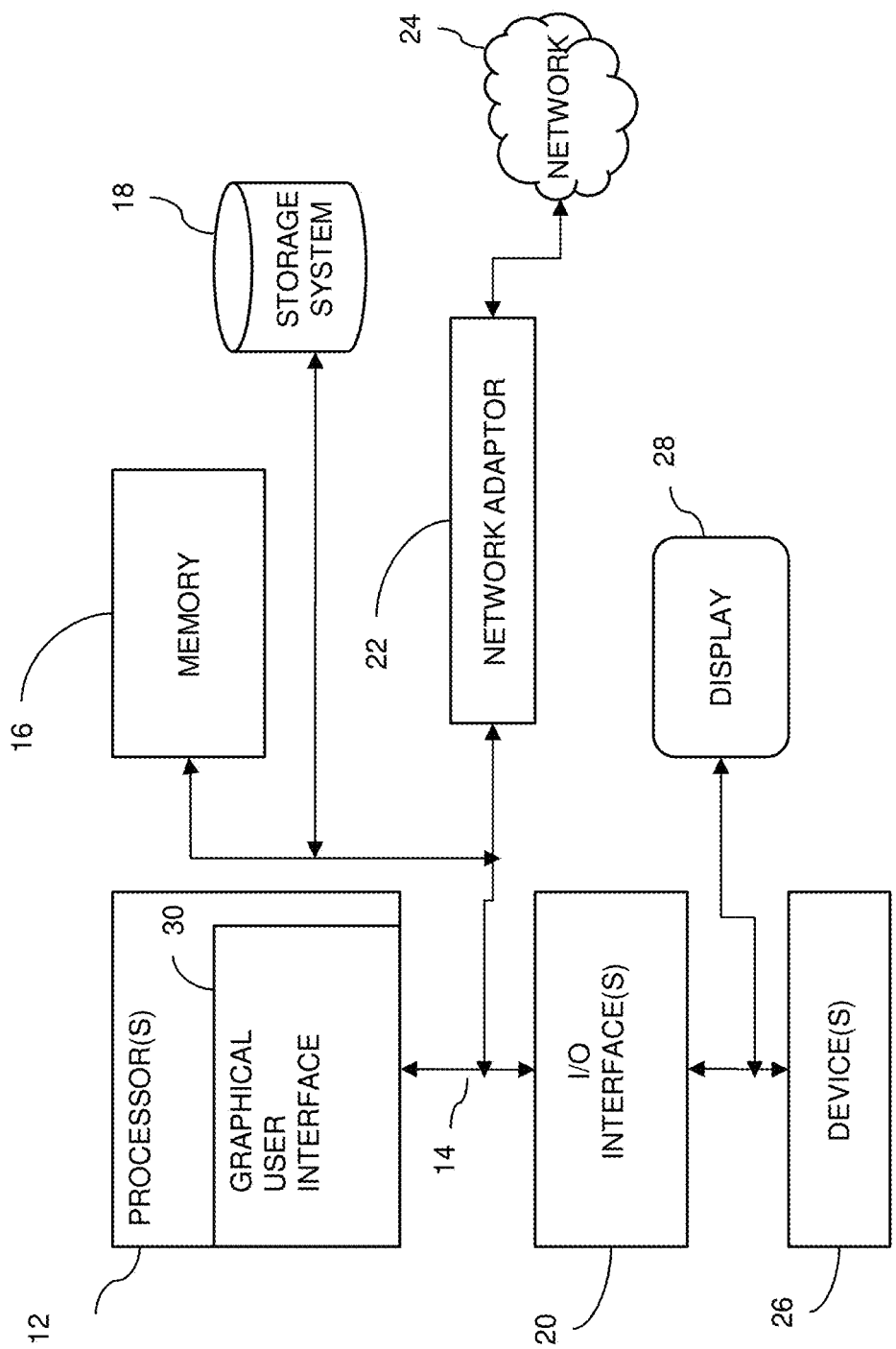
FIG. 7 illustrates a schematic of an example computer or processing system that may implement a system in one embodiment.

FIG. 7 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
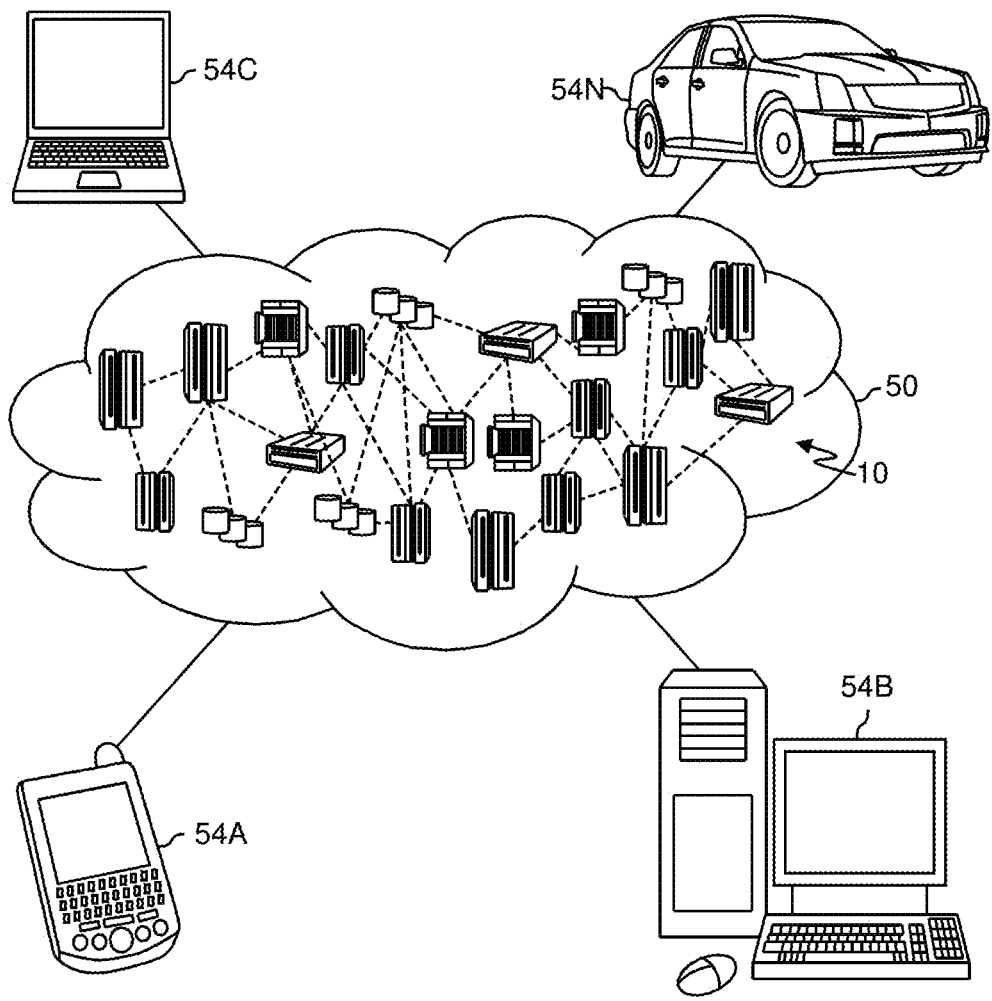
FIG. 8 illustrates a cloud computing environment in one embodiment.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
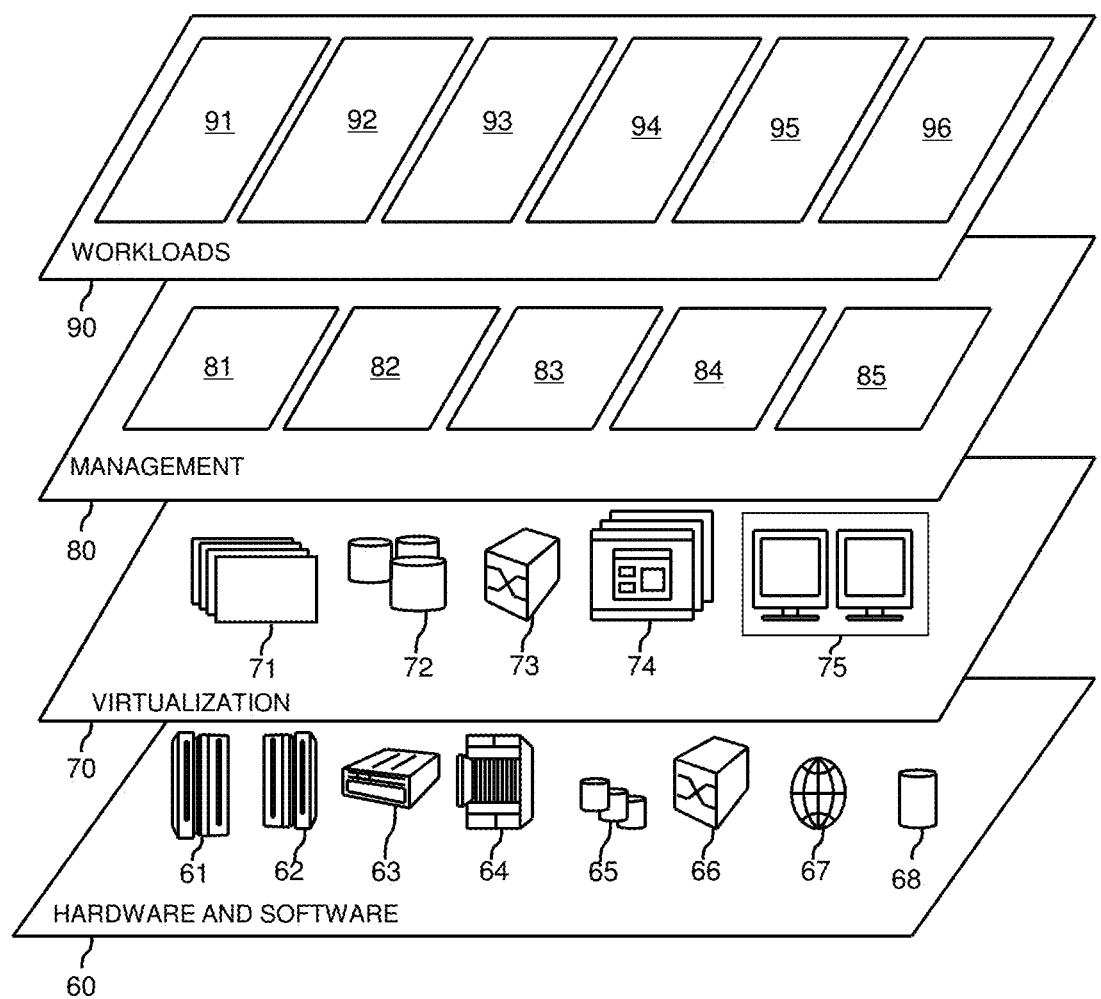
FIG. 9 illustrates a set of functional abstraction layers provided by cloud computing environment in one embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and knowledge graph-based learning processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of training a machine learning prediction model, comprising:
    receiving time series data representing time varying data of an asset;
    receiving a knowledge graph structure including nodes and edges, the nodes representing entities associated with the time series data, the edges representing relationships between the nodes connected by the edges, wherein the relationships represented by the edges are time varying and the knowledge graph structure provides additional information about the asset in addition to the time series data;
    structuring a machine learning model to forecast a prediction using the time series data, the machine learning model having a time series forecasting component and an error component, the time series forecasting component representing the time series data and the error component representing the additional information provided by the knowledge graph structure, the time series data and the knowledge graph structure having different types of co-evolving data-structures, wherein the entities and the relationships represented in the knowledge graph are integrated in the machine learning model as an error term in the error component; and
    training the machine learning model to forecast the prediction based on the time series data and the knowledge graph structure, the training including regularizing the error component for sparsity, the training including alternately updating weights of the machine learning model by proximal gradient descent and updating relationship representation of the knowledge graph structure via a conditional variance using a pseudo-likelihood method, during learning iterations of the training, the machine learning model jointly learning the time series data and the knowledge graph structure during the learning iterations, a connectivity information of the knowledge graph represented by the error component reducing over-parametrization in the time series forecasting component wherein at least some of the connectivity information of the knowledge graph represented in the error component are masked based on a symmetric weight matrix that measures strengths of the relationships represented in the knowledge graph.

2. The method of claim 1, wherein the machine learning model includes a neural network.

3. The method of claim 1, wherein the machine learning model includes a graph neural network.

4. The method of claim 1, wherein the knowledge graph structure is transformed to an inverse covariance matrix of a Gaussian error to be expressed as the error term in the machine learning model.

5. The method of claim 4, wherein the training jointly learns a prediction function of the machine learning model and the knowledge graph structure integrated as the error term represented by the inverse covariance matrix of the Gaussian error.

6. The method of claim 1, wherein the regularizing includes using a soft mask including a real value.

7. The method of claim 1, wherein the regularizing includes using a hard mask including a binary value.

8. The method of claim 1, wherein the prediction includes financial portfolio composition.

9. The method of claim 1, further including providing a user interface for allowing a user to configure a type of the machine learning model, the time series data and the knowledge graph structure.

10. A system comprising:
    a processor;
    a memory device coupled with the processor;
    the processor configured to at least:
        receive time series data representing time varying data of an asset;
        receive a knowledge graph structure including nodes and edges, the nodes representing entities associated with the time series data, the edges representing relationships between the nodes connected by the edges, wherein the relationships represented by the edges are time varying and the knowledge graph structure provides additional information about the asset in addition to the time series data;
        structure a machine learning model to forecast a prediction using the time series data, the machine learning model having a time series forecasting component and an error component, the time series forecasting component representing the time series data and the error component representing the additional information provided by the knowledge graph structure, the time series data and the knowledge graph structure having different types of co-evolving data-structures, wherein the entities and the relationships represented in the knowledge graph are integrated in the machine learning model as an error term in the error component; and
    train the machine learning model to forecast the prediction based on the time series data and the knowledge graph structure, the processor configured to regularize the error component for sparsity during training, the processor configured to train the machine learning model by alternately updating weights of the machine learning model by proximal gradient descent and updating relationship representation of the knowledge graph structure via a conditional variance using a pseudo-likelihood method, during learning iterations of the training, the machine learning model jointly learning the time series data and the knowledge graph structure during the learning iterations, a connectivity information of the knowledge graph represented by the error component reducing over-parametrization in the time series forecasting component wherein at least some of the connectivity information of the knowledge graph represented in the error component are masked based on a symmetric weight matrix that measures strengths of the relationships represented in the knowledge graph.

11. The system of claim 10, wherein the machine learning model includes a neural network.

12. The system of claim 10, wherein the machine learning model includes a graph neural network.

13. The system of claim 10, wherein the knowledge graph structure is transformed to an inverse covariance matrix of a Gaussian error to be expressed as the error term in the machine learning model.

14. The system of claim 13, wherein in training the machine learning model, the processor is configured to jointly learns a prediction function of the machine learning model and the knowledge graph structure integrated as the error term represented by the inverse covariance matrix of the Gaussian error.

15. The system of claim 10, wherein the processor configured to regularize the error term using a soft mask including a real value.

16. The system of claim 10, wherein the processor configured to regularize the error term using a hard mask including a binary value.

17. The system of claim 10, wherein the prediction includes financial portfolio composition.

18. The system of claim 10, further including a user interface configured to received from a user a selection of a type of the machine learning model, the time series data and the knowledge graph structure.

19. A computer program product comprising a computer readable storage medium having program instructions embodied therewith, the program instructions readable by a device to cause the device to:
receive time series data representing time varying data of an asset;
receive a knowledge graph structure including nodes and edges, the nodes representing entities associated with the time series data, the edges representing relationships between the nodes connected by the edges, wherein the relationships represented by the edges are time varying and the knowledge graph structure provides additional information about the asset in addition to the time series data;
structure a machine learning model to forecast a prediction using the time series data, the machine learning model having a time series forecasting component and an error component, the time series forecasting component representing the time series data and the error component representing the additional information provided by the knowledge graph structure, the time series data and the knowledge graph structure having different types of co-evolving data-structures, wherein the entities and the relationships represented in the knowledge graph are integrated in the machine learning model as an error term in the error component; and
train the machine learning model to forecast the prediction based on the time series data and the knowledge graph structure, the device caused to regularize the error component for sparsity during training, the device caused to train the machine learning model by alternately updating weights of the machine learning model by proximal gradient descent and updating relationship representation of the knowledge graph structure via a conditional variance using a pseudo-likelihood method, during learning iterations of the training, the machine learning model jointly learning the time series data and the knowledge graph structure during the learning iterations, a connectivity information of the knowledge graph represented by the error component reducing over-parametrization in the time series forecasting component wherein at least some of the connectivity information of the knowledge graph represented in the error component are masked based on a symmetric weight matrix that measures strengths of the relationships represented in the knowledge graph.

20. The computer program product of claim 19, wherein the machine learning model includes a neural network.

21. The computer program product of claim 19, wherein the machine learning model includes a graph neural network.

22. The computer program product of claim 19, wherein the knowledge graph structure is transformed to an inverse covariance matrix of a Gaussian error to be expressed as the error term in the machine learning model.

23. The computer program product of claim 22, wherein in training the machine learning model, the device is caused to jointly learn a prediction function of the machine learning model and the knowledge graph structure integrated as the error term represented by the inverse covariance matrix of the Gaussian error.

24. The computer program product of claim 19, wherein the prediction includes financial portfolio composition.

25. A computer-implemented method of training a neural network model, comprising:
receiving financial time series data representing time varying data of an asset;
receiving a knowledge graph structure including nodes and edges, the nodes representing entities associated with the financial time series data, the edges representing relationships between the nodes connected by the edges, wherein the relationships represented by the edges are time varying and the knowledge graph structure provides additional information about the asset in addition to the time series data;
structuring a neural network to forecast a prediction associated with a financial portfolio composition, using the financial time series data, the neural network having a time series forecasting component and an error component, the time series forecasting component representing the time series data and the error component representing the additional information provided by the knowledge graph structure, the time series data and the knowledge graph structure having different types of co-evolving data-structures, wherein the entities and the relationships represented in the knowledge graph are integrated in the neural network as an error term in the error component; and
training the neural network to forecast the prediction based on the financial time series data and the knowledge graph structure, the training including regularizing the error term for sparsity, the training including alternately updating weights of the neural network by proximal gradient descent and updating relationship representation of the knowledge graph structure via a conditional variance using a pseudo-likelihood method,
wherein the training jointly learns a prediction function of neural network and the knowledge graph structure integrated as the error component represented by an inverse covariance matrix of a Gaussian error, during learning iterations of the training, a connectivity information of the knowledge graph represented by the error component reducing over-parametrization in the time series forecasting component wherein at least some of the connectivity information of the knowledge graph represented in the error component are masked based on a symmetric weight matrix that measures strengths of the relationships represented in the knowledge graph.

* * * * *